Jan. 6, 1953  C. W. FRY  2,624,066
HANDLE FOR COOKING UTENSILS
Filed Jan. 25, 1950
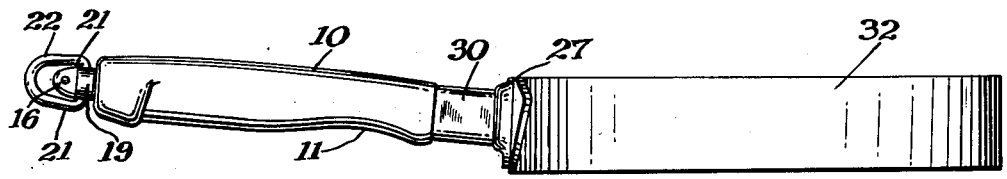
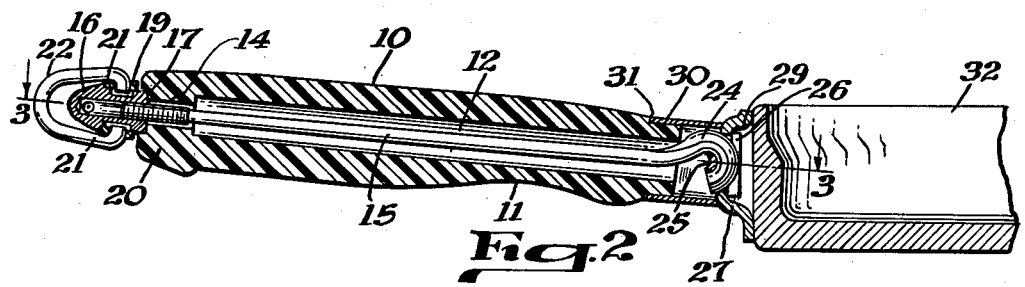
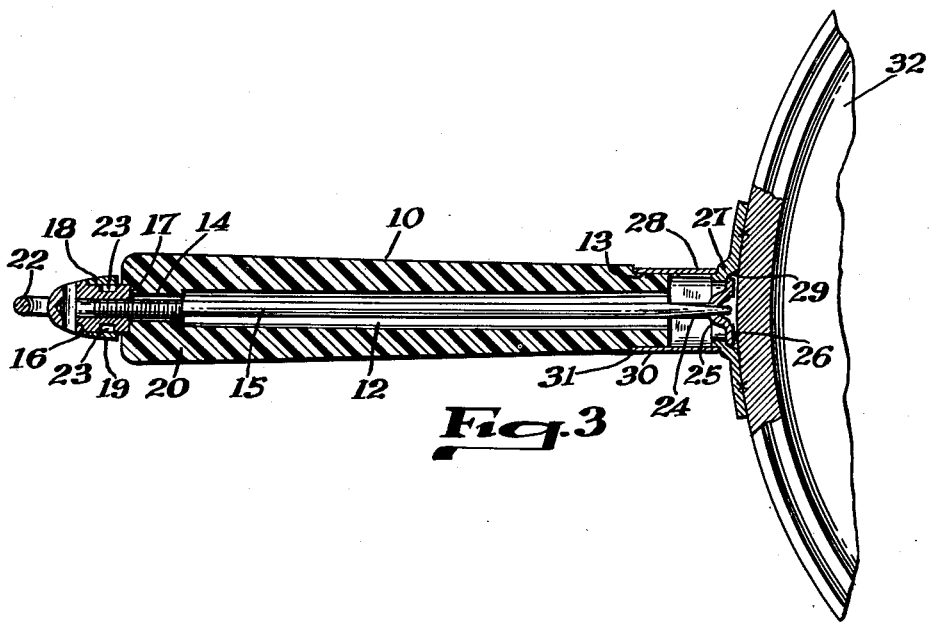
INVENTOR.
CLIFFORD W. FRY.
BY Richey & Watts
ATTORNEYS.

Patented Jan. 6, 1953

2,624,066

UNITED STATES PATENT OFFICE 2,624,066

HANDLE FOR COOKING UTENSILS

Clifford W. Fry, Wooster, Ohio, assignor to The Buckeye Aluminum Company, Wooster, Ohio, a corporation of Ohio Application January 25, 1950, Serial No. 140,496

2 Claims. (Cl. 16—114)

This invention relates broadly to cooking utensils and more specifically to improvements in handles therefor.

One of the objects of the invention is to provide a supporting structure for a handle which is designed to inhibit rotational movement thereof relative to the vessel upon which it is mounted.

Another object of the invention is to provide a handle which may be readily assembled or dismantled without the use of tools other than a pin wrench such as a nail.

Another object of the invention is to support a handle through the medium of a bolt which is formed for the reception of a nut on the free end thereof in order to isolate the threaded parts from the heated body of the pan and thus avoid the deleterious effects of repeated expansion and contraction.

Other objects of the invention reside in provision of a handle which is pleasing in appearance, rigid of structure, economic of manufacture, and designed to accommodate rotational manipulation of the pan as occurs when the contents are poured therefrom.

Other objects and advantages, more or less ancillary to the foregoing, and the manner in which all the various objects are realized, will appear in the following description, which, considered in connection with the accompanying drawings, sets forth the preferred embodiment of the invention.

In the drawings:

Fig. 1 is an elevational view of a pan, including the improved handle portions thereof;

Fig. 2 is a longitudinal section of the handle and bracket secured to the pan; and Fig. 3 is a sectional view taken on the line 3—3 in Fig. 2.

Referring first to Fig. 1, the improved handle comprises a molded non-metallic sleeve 10, generally of prismoidal form with rounded corners and a finger stop 11 on the lower face thereof, an axial opening 12 therein, and a square shoulder section 13 adjacent the inner end thereof. The opening 12 is constricted adjacent its outer end to provide a bearing 14 for a draw bolt 15 constituting the supporting mechanism for the sleeve. The outer end of the bolt is threaded for the reception of a nut 16 which is seated in a counterbore 17 in the end of the sleeve. The nut is machined with a diametrically reduced shank 18 which is provided with a thimble 19 mounted for free rotative movement thereon. The wall of the thimble is cross-drilled intermediate its ends for the support of a pair of internal arms 21 formed in a split supporting ring 22. A groove 23, formed by the reduced shank 18 of the nut 16, provides a clearance for the free ends of the arms 21 and, together with the upper end of the sleeve 10, serves to restrain the thimble 19. The nut 16 is cross-drilled adjacent the end thereof for the reception of a pin wrench or bar.

The inner end of the draw bolt 15 is formed with an arcuate hook 24 adapted for engagement in an eye 25 pierced and pressed from the central portion of a rectangular plate 26. The eye plate is retained in a bracket 27 comprising a sheet metal disk die struck to conform to the contour of the pan to which it is attached and further formed with a rectangular boss 29 defining a pocket for the reception of the plate 26. The plate is proportioned for slight floating movement within the pocket and the face of the shell defining the boss is apertured to clear the distended loop or eye 25 and accommodate the assembly of the hook 24 therewith. The rectangular boss, which, as illustrated herein is square with slightly rounded corners, is dimensioned to form a pilot bearing for a ferrule 30 which is telescopically engaged therewith and with the square section 13 of the handle sleeve. The ferrule is of requisite length to afford impingement of the end walls thereof with the face of the disk 28 and the shoulder 31 contiguous the shank or squared section 13 of the sleeve when the nut on the end of the draw bolt is tightened against the sleeve.

In the manufacture of the improved cooking utensil, the plate 26 is first mounted in the pocket in the bracket 27 with the eye 25 protruding through the apertured portion of the boss. The flanged portion of the bracket is next welded, brazed, or otherwise affixed to the pan 32. Then, after the final polishing operation, the unit may be packed for shipment together with the several parts of the handle assembly.

The vendor or ultimate purchaser of the cooking utensil may assemble the handle by drawing the hooked portion of the draw bolt through the eye, placing the handle sleeve upon the bolt with the ferrule in telescopic engagement with the boss, mounting the nut on the threaded end of the bolt, then tightening the nut against the sleeve. It will be recognized that the latter operation may be readily accomplished by use of a nail or similar instrument.

The major portion of the axial opening 12 in the handle sleeve is preferably larger than the draw bolt 15 in order to provide an air cell for the thermal insulation of the handle and the ferrule on the sleeve is likewise insulated through the void in the domed portion of the bracket 27.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a handle for a utensil, a piece formed with a depression therein defining a pocket and the portion of the piece adjacent the pocket forming a flange for permanent affixation of the piece to a utensil, a plate-like member mounted in the pocket, the member including a projection forming an eye on the front face thereof, the eye extending into an opening in the wall of the pocket forming piece, and a handle portion comprising a rod-like member forming a draw bolt, the end of the rod member being arcuately formed into a hook in engagement with the eye.

2. In a handle for a utensil, a piece formed with a depression therein defining a pocket and the portion of the piece adjacent the pocket forming a flange for permanent affixation of the piece to a utensil, a plate-like member mounted in the pocket, a loop constituting an eye formed on the plate and extending through an opening in the wall of the pocket forming piece, and a handle portion comprising a rod-like member forming a draw bolt, the end of the rod member being arcuately formed into a hook in engagement with the loop.

CLIFFORD W. FRY.

REFERENCES CITED

The following references are of record in the file of this patent:

UNITED STATES PATENTS

| Number | Name | Date |
|---|---|---|
| 1,577,470 | Koehler | Mar. 23, 1926 |
| 2,504,344 | Morrison, Jr., et al. | Apr. 18, 1950 |
| 2,521,463 | Kircher | Sept. 5, 1950 |